UNITED STATES PATENT OFFICE.

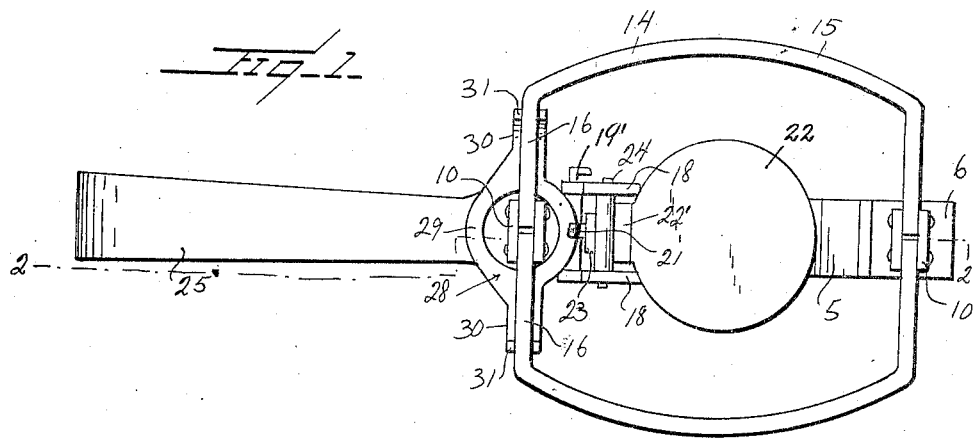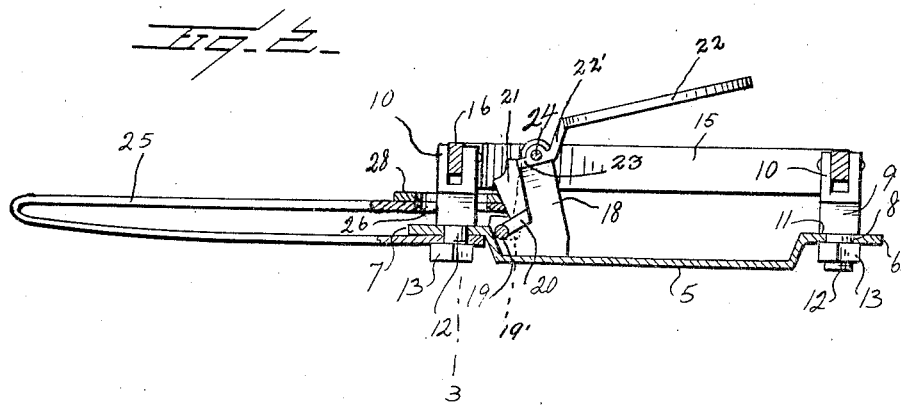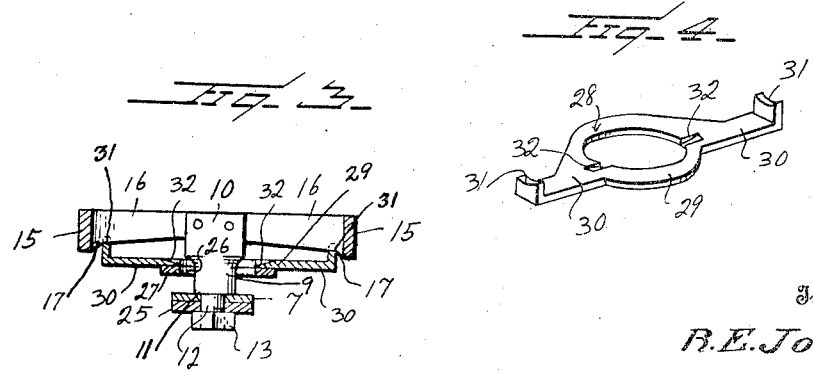

ROBERT E. JONES, OF BREMERTON, WASHINGTON.

ANIMAL-TRAP.

1,358,749.  Specification of Letters Patent.  Patented Nov. 16, 1920.

Application filed January 17, 1920. Serial No. 352,143.

*To all whom it may concern:*

Be it known that I, ROBERT E. JONES, a citizen of the United States, residing at Bremerton, in the county of Kitsap and State of Washington, have invented certain new and useful Improvements in Animal-Traps, of which the following is a specification, reference being had to the accompanying drawings.

This invention relates to animal traps, and has for its object to provide a device of this character that never fails to discharge upon the slightest pressure applied to the trigger mechanism.

Another object is to provide a device of this character having a novel closing member which freely engages the arms of the jaws of the trap and forces the same toward each other through the medium of the spring.

A still further object of the invention is to provide a novel closing member which prevents the arms of the jaws from lying in alinement with their pivot when the trap is set and to resist all forces which would tend to overcome the action of the spring.

With the above and other objects in view, the invention consists in the improved construction and arrangement of parts to be hereinafter more fully described, claimed and illustrated in the accompanying drawings, in which:

Figure 1 is a top plan view of a trap constructed in accordance with my invention.

Fig. 2 is a sectional view taken substantially on the line 2—2 of Fig. 1.

Fig. 3 is a transverse sectional view taken substantially on the line 3—3 of Fig. 2 showing the jaws maintained in an inclined position by the closing member, and Fig. 4 is a detail view of the closing member.

Referring to the drawings, 5 designates the base of the trap having upwardly and outwardly extending offset ends 6 and 7, provided with apertures 8 in each of which a supporting post 9 is mounted. The post 9 is bifurcated at its upper end 10 and includes a shoulder 11 and a threaded depending stem at its lower end 12, the shoulder being intended to engage the upper surface of the base while the stem is passed through the opening 8 and a nut 13 threaded thereon to hold the post stationary.

A pair of jaws 14 are provided, each jaw comprising a medial gripping portion 15 and arm 16. The point of intersection of the arms 16 and the gripping portion 15 is enlarged on one side thereof to provide a shoulder 17, the purpose of which will be hereinafter more fully explained. The ends of the arms 16 are pivoted to the bifurcated end 10 of the post 9 and are arranged to swing freely toward or away from each other.

A pair of supporting arms 18 are secured to the base 5 adjacent one of the offset ends of the base, said arms tapering from the base to their upper portions. A trigger mechanism is supported by the arms 18 and comprises a shaft 19 including at its intermediate portion a projecting lug 20 from the upper surface of which a pawl 21 extends. The shaft 19 is movably supported by the arms 18 adjacent the lower portions of said arms and serves as a medium to hold the trap in its set position. One end of the shaft 19 is extended in angular relation to the body thereof to provide an operating finger piece 19'. The remaining portion of the trigger mechanism comprises a treadle plate 22 having an offset arm 22' including a reduced end 23 adapted to firmly engage one edge of the pawl 21 when the trap is set. Trunnions 24 extend from the arm 22 at the base of the reduced end 23 and are intended to be journaled in the upper ends of the arms 18.

25 designates a V-shaped expansion spring having an opening 26 in each end thereof. One end of the spring is positioned on the threaded stem of one of the posts 9 and is secured thereto by the nut 13 of the post between the nut and the base 5. The other end of the spring is enlarged as at 27 and is freely disposed on one pair of jaw arms 16 to force the same toward each other.

In order to assist the spring to close the jaws and to overcome any resistance offered by frost or like obstructions when the trap is discharged, a closing member 28 is provided and comprises an annular member 29, having oppositely extending arms 30, the ends of the arms being bent at right angles and having their edges concaved as at 31. An inclined recess is provided in the annular member in alinement with the extending arms 30 and penetrates the interior edge of the member. The annular member is freely disposed on one pair of the arms 16 and rests upon the enlarged end 27 of the spring. When the trap is set, the portion of the arm 16 adjacent the shoulders 17 engages the concaved portions 31 of the arms 30, while the lower portions of the arms adjacent their pivoted end lie within the recess 32. By this means the ends of the arms 30 engage the shoulders and prevent downward movement of the jaws. At the same time, the pivoted ends lying within the recesses 32 cause the jaws to assume an inclined position so that the shoulder 17 or gripping portion 15 lie above the plane of the pivoted ends of the jaws and thereby eliminate binding such as would tend to prevent pivotal movement of the jaws.

Through this novel closing member, when the trigger mechanism is operated, the spring performs the usual function of expanding, but instead of directly engaging the arm 16 of the jaws, it engages the closing member and causes the arms 30 thereof to force the gripping portions 15 of the jaws toward each other, thereby greatly increasing the power of the spring and also overcoming any resistance to the spring.

From the foregoing it will be readily seen that this invention provides a novel device that not only makes the trap more efficient, but permits the same to discharge upon the slightest pressure applied thereto and permits the trap to be used in all kinds of weather and places without danger of the action of the spring being interfered with.

What is claimed is:—

1. In a trap of the class described, a base, pivoted jaws carried by said base, a spring secured at one end to the base and movably connected at its other end to the jaws, a trigger pawl and lever plate operatively engaged with the movable end of the spring, and a closing member loosely mounted on the jaws and arranged to force said jaws toward each other through the medium of the spring.

2. In a trap of the class described, a base, pivoted jaws carried by said base, a spring secured at one end to the base and movably connected at its other end to the jaws, a trigger pawl and lever plate operatively engaged with the movable end of the spring, and a closing member freely mounted on the jaws, said closing member having its ends extended in angular relation to the closing member to prevent the pivotal connections of the jaws from binding when the spring is released.

3. In a trap of the class described, a base, pivoted jaws carried by said base, a spring secured at one end to the base and movably connected at its other end to the jaws, a trigger pawl and lever plate operatively engaged with the movable end of the spring, and a closing member freely surrounding one pivoted end portion of the adjacent jaw ends and adapted to hold the jaws in a position to be instantly swung toward each other when the trap is discharged.

4. In a trap of the class described, a base, jaws pivoted to said base, a spring secured at one end to the base, the other end of the spring being operatively engaged with the jaws, a bracket extending from the base, a treadle plate pivotally supported by the upper portion of the bracket, an oscillating shaft supported by the bracket beneath the free end of the spring, a lug projecting outwardly from said shaft beyond said end of the spring, a pawl extending from the end portion of said lug in right angular relation thereto, said pawl being disposed in engagement on one side thereof with the spring and on the other side with the treadle plate, the upper portion of said pawl extending over said free end of the spring.

5. A trap of the character described comprising a base having its end portions off-set, arms extending through said off-set portions and having one of their ends terminating flush with the lower surface of said base, a spring having one end surrounding the end portion of one of said arms in engagement with the lower surface of the adjacent off-set end, the other end of said spring surrounding the other end portion of said arm above the base, a closure member freely disposed on the last mentioned end portion of said arm in engagement with the second mentioned end of the spring, a bracket extending from the base closely adjacent the last mentioned off-set end, a treadle plate pivotally supported by the upper portion of the bracket, a shaft having its ends journaled in the lower portion of the bracket, a pawl extending from said shaft in off-set relation thereto, said pawl being disposed between and in engagement with the second mentioned end of the spring and follower, and the treadle plate.

In testimony whereof I hereunto affix my signature.

ROBERT E. JONES.